Patented Nov. 22, 1938

2,137,226

UNITED STATES PATENT OFFICE 2,137,226

EMULSION AND PROCESS FOR PRODUCING THE SAME

Ulric B. Bray and Lawton B. Beckwith, Palos Verdes Estates, Calif., assignors to Union Oil Company of California, Los Angeles, Calif., a corporation of California No Drawing. Application March 30, 1934, Serial No. 718,214

4 Claims. (Cl. 134—1)

The present invention relates to aqueous emulsions of bitumen or asphalt, pitch, tar and tarlike substances, resins and other bituminous substances of natural or artificial origin and to a process for making the same.

It is an object of this invention to produce an alkaline type bituminous emulsion, i. e. an emulsion wherein alkali such as sodium hydroxide is employed as the emulsifying agent for the bituminous material and yet which will have the desirable characteristics and advantages of a clay type emulsion.

In the production of bituminous emulsions it is generally recognized that it is desirable to obtain a fine particle size for the emulsified asphalt or bitumen in order to obtain a permanent dispersion of the asphalt which will not settle nor cream upon standing as well as to obtain satisfactory viscosities for the emulsion. The emulsion must be sufficiently stable to resist dispersion during transportation and storage.

Heretofore it has been proposed to produce bituminous emulsions wherein an alkali is used as the emulsifying agent by heating the bituminous substance or asphalt to a temperature above its melting point and then adding a small proportion of saponifiable material such as, for example, a fatty acid, resin or resin oil. The mixture of melted asphalt and saponifiable material is then agitated with an aqueous solution of an alkali such as, for example, caustic soda or potash or sodium or potassium carbonate.

In recent years aqueous bituminous emulsions have been produced by omitting the addition of saponifiable material to the asphalt. The melted asphalt is emulsified directly with an aqueous solution of caustic alkali. The emulsification is accomplished by the saponification of the natural saponifiable materials in the asphalt itself. Asphalt emulsions produced by this method are usually of the quick breaking type, that is, they will break rapidly when mixed with the mineral aggregate or when spread upon a surface. When it is desirable to increase the stability and/or permanency of the quick breaking emulsion, a small amount of stabilizing agent such as soap is added thereto. Emulsions produced by this process are suitably employed as binders, adhesives and coating compositions but are more particularly employed in road building, such as, for example, by the cold laying process or by the so-called penetration method which consists essentially in spraying pouring or pumping the asphalt emulsion upon the mineral aggregate on the road bed. The stabilized emulsions, i. e. those in which are incorporated a stabilizing agent such as a small percentage of soap, may be premixed with an aggregate in which case the mixture is then spread upon the road and is follower by tamping and rolling. The alkaline type emulsion is characterized by an extremely fine particle size which as stated above is very desirable in the production of stable and permanent emulsions.

On the other hand clay type emulsions are produced by suspending in water so as to form a clay slurry, a suitable colloidal clay such as bentonite, in concentrations, for example 5% by weight of the clay in 95% water. This clay slurry is agitated in a pot using a propeller for agitation at a temperature near the softening point of the asphalt to be emulsified. The asphalt in a molten condition is then added slowly to the clay slurry. The addition of asphalt is continued until a suitable working consistency, preferably a rather viscous but mobile paste, is obtained. Thereafter, more clay slurry containing a lower percentage of clay and more melted asphalt are added simultaneously while the emulsion is drawn off at a rate which will maintain a constant level in the emulsifying kettle. Clay type emulsions differ from the alkaline type emulsion in that they are very stable towards mixing with very fine aggregates such as cement, sand, asbestos fiber and the like and are preferably employed as binders for mastics in water proofing, pipe line protection, corrosion proofing and the like. However, these emulsions do not possess the extremely fine article size of the alkaline type emulsion.

It is another object of our invention to produce an aqueous bituminous emulsion having a fine particle size which is characteristic of the alkaline type emulsion heretofore mentioned and yet having the desirable characteristics of stability against breaking when mixing with line aggregates or fibers which is characteristic of the clay type emulsion.

Another object of our invention resides in a bituminous emulsion and in a process for producing the same comprising in first forming an alkaline type emulsion heretofore mentioned by the agitation of melted asphalt with an aqueous solution of, for example, caustic alkali and in then incorporating a mineral colloid into the alkaline emulsion for the purpose of stabilizing the latter.

A further object of our invention resides in first stabilizing the alkaline type emulsion heretofore mentioned with a suitable stabilizer other than a mineral colloid, such as, for example, casein and in then incorporating a mineral colloid into the stabilized emulsion.

Another object of the invention resides in the feature of cooling the alkaline type emulsion prior to the addition of the stabilizer or stabilizers.

Another object of the invention comprises in adding an acidulated clay to the fine grained alkaline emulsion.

Various other objects and advantages of the invention will become apparent to those skilled in the art from the following description of the preferred manner of compounding the preferred composition which is given herein for the purpose of illustrating and explaining the invention and which is not to be considered as limiting.

We have discovered that aqueous bituminous emulsions having a fine particle size and yet having the desirable characteristics of clay type emulsions may be produced by first emulsifying melted asphalt with an aqueous solution of an alkali such as, for example, caustic soda, then cooling the emulsion thus produced to a temperature of approximately 85 to 95° F. and then incorporating a mineral colloid stabilizer, such as, for example, bentonite clay, into the fine grained alkaline emulsion.

We have further discovered that in some instances it is preferable to first stabilize the fine grained alkaline emulsion with a stabilizer other than a mineral colloid, for example, casein, and then incorporating a mineral colloid into the casein stabilized emulsion. In some instances, we have found that the addition of a mineral colloid to the alkaline emulsion will cause local breakdown and that it is necessary to first stabilize the emulsion with a stabilizer such as casein before adding clay.

The invention will be best understood by reference to the following description which refers to examples for producing types of emulsions indicated above.

*Example 1*

A primary fine grained emulsion is first produced by emulsification with caustic soda alone by heating approximately 65% by weight of asphalt produced from Poso Creek residuum and having 150 penetration at 77° F. (A. S. T. M. Method D-5-25) to a temperature of approximately 320° F. after which the melted asphalt is passed through a mixing device in which the heated asphalt is mixed with alkaline water containing approximately 0.3 to 0.4% of sodium hydroxide by weight. Agitation by circulating the emulsion through the mixing device is continued until the asphalt is finely dispersed in the caustic alkali solution. The emulsion so produced comprises one containing a fine grained texture and is of the quick breaking type. This emulsion is then cooled to a temperature of approximately 85 to 95° F. by circulating the hot primary emulsion through cooling coils. When the temperature of the emulsion has been reduced, as above indicated, a mineral colloid, such as bentonite clay, is thoroughly mixed and incorporated into the primary emulsion. The mineral colloid is best added in the form of a water slurry and in sufficient quantity as to incorporate 1 to 2% of the clay in the finished emulsion.

*Example 2*

A fine grained asphaltic emulsion is produced by emulsification of melted asphalt with caustic soda solution alone as in Example 1, then the primary emulsion is cooled to a temperature of approximately 85 to 95° F. after which sufficient casein solution carrying 10% of sodium caseinate by weight is introduced into the emulsion so as to incorporate 1% of casein by weight into the emulsion. After the addition of the casein and thorough agitation to incorporate the same into the emulsion, a clay slurry of Wyoming bentonite is added in sufficient quantity as to incorporate 1 to 2% of the bentonite in the finished emulsion.

*Example 3*

A fine grained asphaltic emulsion is first produced by emulsification of melted asphalt with an aqueous solution of caustic alkali alone as described in Example 1, after which the emulsion is cooled to approximately 60° F. and is intimately mixed with an acidulated clay slurry which is produced by suspending clay in water and adjusting the acidity or alkalinity by the addition of suitable reagents such as acetic acid as is well known by those skilled in the art. The mixture is very thoroughly agitated and the best results are obtained by effecting the admixture in an apparatus adapted from an ordinary ice cream freezer. The mixing is preferably carried out in the following manner. An acidulated clay slurry containing 1 to 5% of Wyoming bentonite and maintained at a temperature of 60° F. or less is violently agitated by such a mechanical device as for example, a propeller and the primary fine grained asphaltic emulsion is added slowly to the rapidly moving clay slurry so that each particle of asphalt in the emulsion becomes coated with clay before sufficient time has elapsed to permit the non-protected asphalt particles from coalescing with one another. The essential feature of this process therefore consists in converting a quick breaking alkaline type emulsion instantaneously into a highly stable neutral or acid clay type emulsion.

The foregoing exemplary description of our invention is not to be considered as limiting since many variations may be made within the scope of the following claims by those skilled in the art without departing from the spirit thereof.

We claim:

1. A process for producing aqueous bituminous emulsions of the slow breaking type which comprises emulsifying melted asphalt with an aqueous solution of alkali to produce a dispersion of the quick breaking type, cooling said dispersion, then adding a small amount of an organic agent to stabilize said dispersion and subsequently commingling said stabilized dispersion with a small amount of clay.

2. A process as in claim 1 in which the dispersion is cooled to approximately 85 to 95° F. before adding said organic stabilizer.

3. An aqueous bituminous emulsion comprising approximately 65% by weight of asphalt, approximately 1% by weight casein, approximately 1 to 2% by weight of acidulated clay and the remainder water containing approximately 0.3% to 0.4% by weight of sodium hydroxide.

4. A process as in claim 3 in which the dispersion is cooled to below approximately 95° F. before adding said organic stabilizer.

ULRIC B. BRAY.
LAWTON B. BECKWITH.

CERTIFICATE OF CORRECTION.

Patent No. 2,137,226.

November 22, 1938.

ULRIC B. BRAY, ET AL.

It is hereby certified that error appears in the printed specification of the above numbered patent requiring correction as follows: Page 1, second column, line 4-5, for "follower" read followed; line 34, for the word "article" read particle; line 41, for "line" read fine; page 2, second column, line 68, claim 4, for the claim reference numeral "3" read 1; and that the said Letters Patent should be read with this correction therein that the same may conform to the record of the case in the Patent Office.

Signed and sealed this 14th day of March, A.D. 1939.

Henry Van Arsdale.

(Seal)

Acting Commissioner of Patents.